Aug. 30, 1960    P. A. FRANK    2,950,592
RESONANT PULSE JET ENGINE HAVING AN ENGINE VALVE ANTECHAMBER
Filed Jan. 6, 1954    2 Sheets-Sheet 1
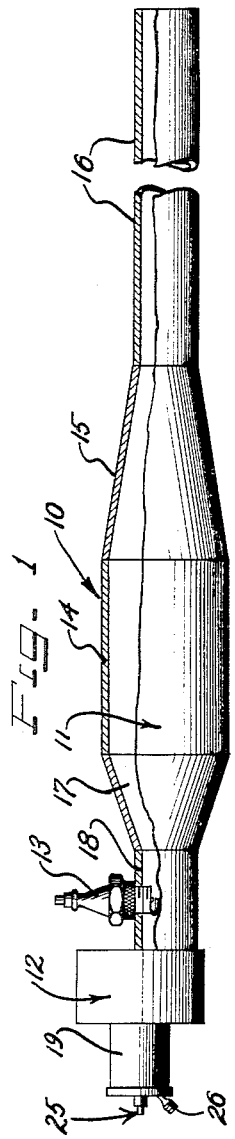
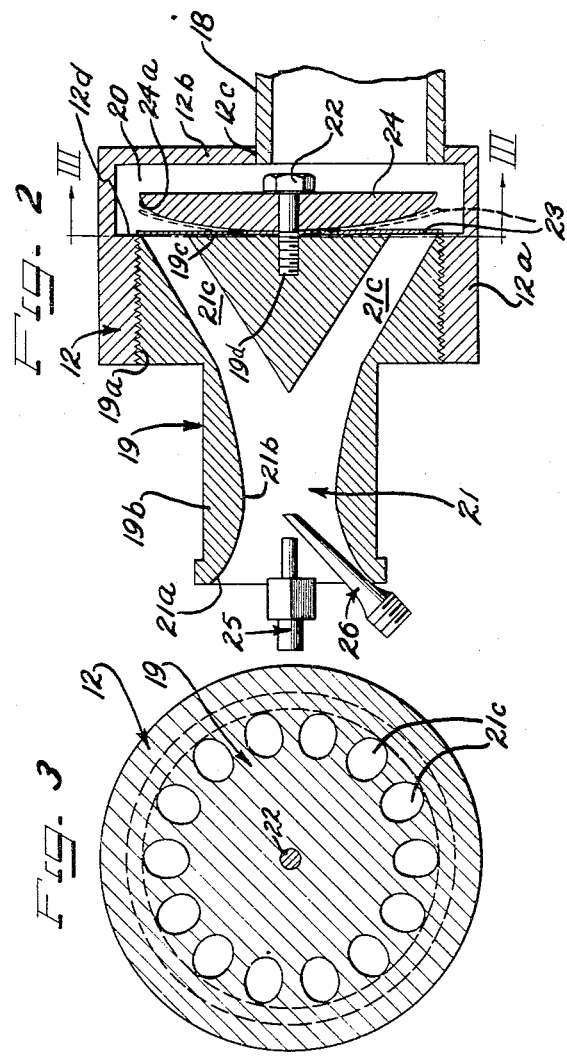
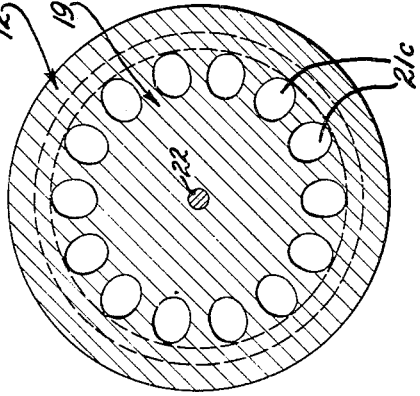
Inventor
PAUL A. FRANK
By Hill, Sherman, Meroni, Gross & Simpson
Attys.

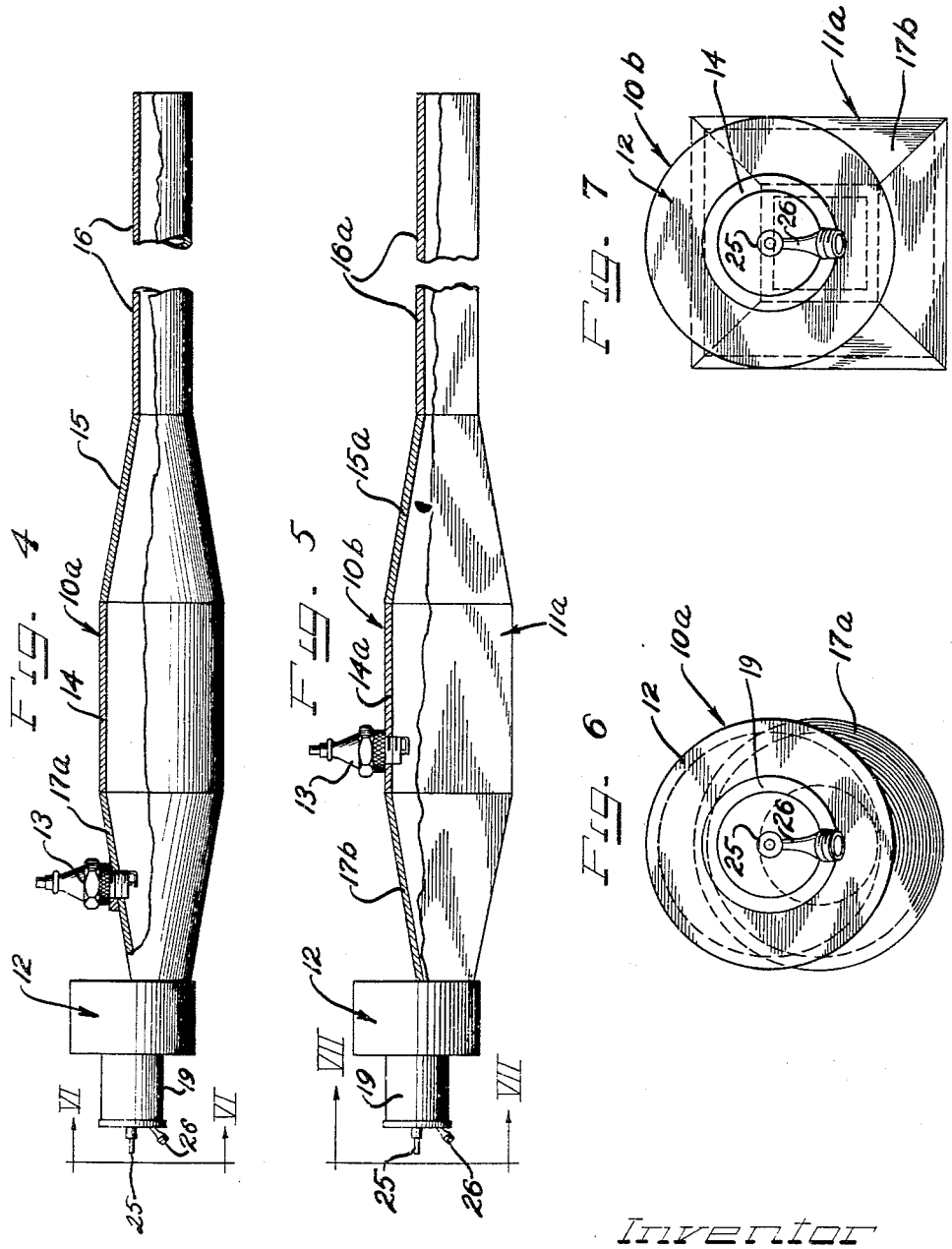

United States Patent Office 2,950,592
Patented Aug. 30, 1960

2,950,592

RESONANT PULSE JET ENGINE HAVING AN ENGINE VALVE ANTECHAMBER

Paul A. Frank, Bedford, Ind., assignor to Curtis Automotive Devices, Inc., Bedford, Ind., a corporation of Ohio Filed Jan. 6, 1954, Ser. No. 402,539

2 Claims. (Cl. 60—35.6)

This invention relates to resonant pulse jet devices equipped with antechambers between the combustion chambers and fuel charge inlets of the devices. Specifically, this invention deals with a resonant pulse jet engine having an engine valve antechamber which is connected to the engine combustion chamber by a diffuser passage having a diverging portion opening into the engine combustion chamber for reducing the operating temperature of the engine valve and for increasing the thermal efficiency of the engine.

While the invention will hereinafter be specifically described as embodied in a small size pulse jet engine primarily designed not for propulsion by jet thrust but for use as heaters, steam generators, fog-producing machines, and any non-jet propelled device in which useful work is developed by resonant pulsation of exploding fuel charges, it should be understood that the principles of the invention are also useful in such jet-propelled engines.

Pulse jet engines, in general, include an inlet air-receiving throat into which fuel is aspirated to produce a fuel charge. A vibrating valve or reed intermittently admits the fuel charge to a combustion chamber. The charge is ignited in this chamber and the burning gases are discharged into an elongated exhaust tube or tailpipe. The pressure of the burning gases causes rapid discharge of gases out of the tailpipe or exhaust tube to produce a jet thrust. The back-pressure created by the explosion or the burning in the combustion chamber is also effective to close the valve whereupon inertia of the gases in the exhaust tube produces a reduced pressure condition in the combustion chamber. This reduced pressure is below atmospheric pressure and a reverse flow thereupon takes place in the exhaust tube forcing a portion of the hot residual combustion gases back into the combustion chamber and opening the valve to draw in a fresh fuel charge. This dual reverse flow continues until the fresh charge is heated sufficiently to be ignited whereupon the valve is again closed and the additional jet thrust from the newly introduced fuel charge is produced in the tailpipe. The resonance of the system is effective to develop an orderly succession of pulses to establish a definite operating cycle.

Heretofore, the inlet valve for pulse jet engines has been exposed to the full flame front in the combustion chamber. High valve operating temperatures have, therefore, been encountered resulting in failures and "burnouts" and limiting the useful valve materials to high temperature resisting materials which do not always possess the best operating characteristics.

The present invention now provides an antechamber for a pulse jet engine valve and a diffuser passage between this chamber and the combustion chamber of the engine. Regulation of the antechamber and diffuser passage dimensions and shapes makes possible a control of the operating temperature of the valve and any desired valve material possible can be used including relatively low temperature resisting materials such as rubber, plastics, fabrics, and the like. The diffuser chamber or passage preferably includes a section which diverges toward the combustion chamber so as to provide a choking effect on the flame front movement toward the valve chamber. This diverging or tapered portion can be part or all of the passage between the valve chamber and the combustion chamber.

It is then an object of this invention to provide a resonant pulse jet device with an antechamber between the inlet valve and the combustion chamber of the device.

A further object of this invention is to provide a resonant pulse jet apparatus with a diffusion chamber or passage between the combustion chamber and the engine valve.

A specific object of this invention is to provide a resonant pulse jet engine with an antechamber between the engine inlet valve and the engine combustion chamber and with a diffuser passage between the antechamber and the combustion chamber for controlling the rate of pressure rise in the combustion chamber while choking off the flame front flow back to the engine valve.

A further object of the invention is to provide a resonant pulse jet engine with a controlled temperature inlet valve.

A further object of the invention is to provide a resonant pulse jet engine wherein the fresh fuel charge and the residual charge in the combustion chamber are stratified to increase engine combustion efficiency.

Other and further objects of this invention will become apparent to those skilled in the art from the following detailed description of the annexed sheets of drawings which, by way of preferred examples only, illustrate several embodiments of the invention.

In the drawings:

Figure 1 is a broken longitudinal view, partly in cross-section, of a resonant pulse jet engine suitable for a model airplane or the like and including an antechamber and a tapered diffuser passage in accordance with this invention.

Figure 2 is an enlarged fragmentary vertical cross-sectional view, with parts in side elevation, of the front end portion of the engine shown in Figure 1.

Figure 3 is a transverse cross-sectional view taken along the line III—III of Figure 2.

Figure 4 is a view similar to Figure 1 but illustrating a modified embodiment of the invention.

Figure 5 is a view similar to Figure 1 but illustrating a further modification.

Figure 6 is a front plan view taken along the line VI—VI of Figure 4.

Figure 7 is a front plan view taken along the line VII—VII of Figure 5.

As shown in the drawings:

In Figure 1, the resonant pulse jet engine 10 includes a generally tubular metal body 11 having a valve housing 12 mounted on the front end thereof and carrying a sparkplug or glowplug 13 just rearwardly of the valve housing 12.

The tubular body 11 includes the conventional combustion chamber portion 14 of relatively large diameter terminating in a tapered frustoconical portion 15 which converges to a smaller diameter elongated exhaust tube or tailpipe portion 16.

In accordance with this invention, the front end of the combustion chamber portion 14 communicates with a converging diffuser passage defining portion 17 extending to a reduced diameter cylindrical portion 18 carrying the spark or glowplug 13. The diffuser passage defining portion 17 is somewhat shorter than the portion 15 between the combustion chamber and the tailpipe. This diffuser portion, however, may be considered to include the cylindrical portion 18 so that an elongated passage is provided between the valve housing 12 and the combustion chamber 14, part of which passage is tapered to converge from the combustion chamber for choking off the flame front propagation toward the valve chamber.

As best shown in Figure 2, the valve housing 12 is mounted on the front end of the cylindrical portion 18 in any suitable manner as by welding, press-fit, or the like. This housing includes a cylindrical side wall 12a, a flat back wall 12b having an eccentric aperture 12c receiving the portion 18 therein to position the major portion of the back wall above the portion 18 immediately in front of the glowplug or the sparkplug, and an internal shoulder 12d extending inwardly from the side wall in spaced relation from the back wall 12b and from the front end of the housing. A head member 19 has an enlarged threaded end 19a in threaded engagement in the front end of the housing 12. A valve chamber 20 is provided between this head and the back wall 12b. The chamber 20 contains the shoulder 12d. The eccentric mounting of the housing 12 on the portion 18 minimizes trapping of fuel in a well that would otherwise be provided in the chamber 20 below the level of the bottom of the portion 18.

The head 19 has a reduced diameter forwardly projecting portion 19b which is hollow and which defines a forwardly opening venturi passage 21. The passage 21 converges from an inlet mouth 21a at the front end of the portion 19b to a restricted throat 21b and then diverges from this throat to a plurality of radiating passages 21c. The passages 21c extend to the back face 19c of the head 19 and as shown in Figure 3, are disposed adjacent the periphery of this back face. The back face 19c as shown in Figure 2 is flush with the shoulder 12d although it could project beyond the shoulder into the chamber 20.

The back of the head 19 has a central tapped blind hole 19d receiving the threaded end of a bolt or stud 22. This bolt 22 carries a thin valve disk 23 and projects through the central portion of the disk. A rigid circular backstop 24 is also carried by the bolt to clamp the central portion of the disk against the back face 19c of the head 19. The backstop has a convex front face 24a diverging away from the back face 19c of the head 19 from the center to the periphery thereof so that the peripheral portion of the valve disk can vibrate as a reed to open and close the ports provided by the passages 21c.

The valve disk 23 can be composed of any suitable flexible material such as metal, rubber, plastic, fabric, or the like. This material should have sufficient inherent resiliency so that it will not wrap around the convex face 24a of the backstop to tightly adhere to this face, but will spring back against the back face 19c.

A starting air supply tube 25 projects in the mouth 21a of the venturi throat 21. A fuel supply tube 26 projects into the throat 21b in front of the discharge end of the air tube 25. Discharge of air from the tube 25 will effect an aspiration of fuel out of the tube 26 and the venturi throat 21b will serve to draw the fuel and air mixture downstream into the supply passages 21c.

It will be understood that the valve 23 operates entirely in the chamber 20 which is spaced from the combustion chamber portion 14 and communicated therewith only through the diffuser passage provided by the reduced diameter tubular portion 18 and the tapered portion 17.

In operation of the engine 10, a fresh fuel and air charge is introduced into the combustion chamber through the diffuser passage provided by the portions 17 and 18. As this charge progresses through the tapered portion 17 of the passage, its velocity is reduced and its frontal area is gradually increased. In this manner, a stratified layer of fresh fuel charge is fed to the combustion chamber with a minimum of contamination by residual combustion products. This results in increased engine efficiency.

During the combustion phase of the engine operating cycle, the flame front progresses through the combustion chamber 14 into the converging diffuser portion 17 for a predetermined distance. However, as the flame progresses toward the valve, the area of the flame front is gradually diminished due to the converging shape of the portion 17. This reduction in flame frontal area provides a control of the rate of pressure rise in the combustion chamber 14. The reduction in frontal area also results in the burning of relatively large volumes of fresh fuel charge in the combustion chamber without the detrimental effects of overheating the engine valve in view of the remote location of the valve in the chamber 20 with respect to the flame front.

When pressure in the combustion chamber 14 is below atmospheric pressure, as after an explosion and a thrust jet discharge obtained from such explosion, the valve will open to the dotted position shown in Figure 2 and the fuel will flow into the antechamber or valve chamber 20 and thence through the aperture 12c in the back wall of this chamber to the diffuser passages provided by the portions 18 and 17. During part of this charging period air also flows into the exhaust end of the tube 17 forcing a portion of the hot residual combustion gases back into the combustion chamber 14. This dual flow toward the combustion chamber continues until the fresh charge is heated sufficiently by either the plug 13 or the hot residual gases until it ignites. Once the flame front is established it progresses rapidly through the combustion chamber 14 toward the diffuser passage and increases the combustion chamber pressure so that even a portion of the unburned charge in the antechamber 20 may be compressed. When the pressure in this antechamber 20 reaches a value sufficient to eliminate the pressure differential across the valve, the valve will automatically close. When the pressure in the combustion chamber 14 then reaches a value sufficient to reverse the direction of flow in the exhaust tube 16, the engine does its useful work by expelling air and combustion products through the exhaust tube at relatively high velocity.

The pressure in the combustion chamber 14 continues to rise until a sufficient weight of combustion products has been expelled through the exhaust tube 16 and as the exhaust process continues, the pressure in the combustion chamber diminishes to a value less than atmospheric. This low pressure in the combustion chamber is produced by the velocity and the mass of the combustion products traveling through the exhaust tube 16.

In the above described manner, a single cycle of engine operation is effected. The engine will continue to operate at its designated cycle frequency once combustion has been initiated.

In the modified resonant pulse jet engine 10a of Figures 4 and 6, parts identical with parts described in Figures 1 to 3, have been marked with the same reference numerals. In the engine 10a, however, the diffuser passage is provided by a continually tapered portion 17a extending from the antechamber in the valve housing 12 to the front end of the combustion chamber 14. The passage 17a accomplishes the same results as the combined passages 17 and 18 in Figure 1. The engine 10a operates in the same manner as described above in connection with the engine 10.

The engine 10b, of Figures 5 and 7, includes a tubular body 11a of square cross-section instead of circular cross-section. The body 11a thus has a square tailpipe portion 16a, a square tapered portion 15a between the square combustion chamber portion 14a and the tailpipe portion 16a, and the tapered portion 17b between the combustion chamber 14a and the valve head or housing portion 12 is also of square configuration. Further, the sparkplug or glowplug 13 is mounted in the combustion chamber 14a. The positioning of the heating plug 13 may be varied between the diffuser passage and the combustion chamber as indicated.

The engine 10b operates in the same manner as the engines 10 and 10a, and parts identical with these engines have been marked with corresponding reference numerals.

From the above descriptions it should be understood that this invention provides a resonant pulse jet device with an antechamber for the valve of the device and a diffuser passageway between this antechamber and the combustion chamber of the device. In this manner, the operating temperature of the engine valve and the head assembly of the device is greatly reduced and valve materials can be selected for desired performance characteristics without regard for temperature resisting characteristics. Efficiency of the pulse jet device is greatly increased by the stratification of the fresh and residual charges in the combustion chamber made possible by the use of the diffuser passage. The residual heat that normally flows from the combustion chamber to the valve and head assembly each time the device ceases to operate, will be effectively stopped to eliminate the heretofore encountered detrimental effects on the valve and head assembly.

It will be understood that variations and modifications may be effected without departing from the novel concepts of the present invention.

I claim as my invention:

1. In a pulse jet device including a combustion chamber, an exhaust tube, and an inlet valve assembly having a vibrating element at its outlet, the improvement of means defining an antechamber for the valve's vibrating element immediately downstream thereof and in spaced upstream relation from the combustion chamber, said antechamber having a flow area somewhat larger than the flow area of the valve, and said antechamber having an outlet with a flow area somewhat smaller than the flow area of said antechamber; and means defining a tapered diffuser passage diverging between the antechamber outlet and the combustion chamber to provide a passage of increasing area for flow toward the combustion chamber and effective to reduce the velocity of said flow while choking reverse flow, the valve axis, the antechamber axis, and the antechamber outlet axis being substantially parallel to each other, said antechamber outlet axis being radially and downwardly offset with respect to the axis of the antechamber and axially aligned with the axes of said diffuser portion, the combustion chamber, and the exhaust tube, the amount of said offset being such that the antechamber is substantially fuel-trap-free.

2. A pulse jet engine which comprises a tubular body having an elongated combustion chamber portion of uniform transverse sectional area, an elongated tail-pipe portion of reduced size connected to one end of said combustion chamber portion, a tapered diffuser portion, and an intermediate elongated diffuser portion of uniform sectional area, said tapered diffuser portion converging from the opposite side of the combustion chamber portion to one end of said intermediate elongated diffuser portion; a valve casing on the other end of said intermediate diffuser portion, said casing having a venturi fuel-air inlet diverging to a valve chamber downstream of said inlet; a vibrating-element valve in said valve chamber for controlling fuel-air flow to the combustion chamber; said valve chamber having an outlet axially aligned and communicating with said other end of said intermediate diffusor portion, said valve chamber having a flow area somewhat larger than the flow areas of said venturi-inlet, of its outlet, and of said intermediate diffuser portion; means for introducing fuel and air into said venturi-inlet of said casing; and an ignition plug at a point downstream of said valve chamber and upstream of said combustion chamber and adapted to ignite the fuel-air mixture downstream from said valve chamber; said diffuser portions being jointly effective to choke reversely directed flame propagation moving from the combustion chamber so as to preclude ignition of the fuel-air mixture in said valve chamber downstream of said valve; said one end of said intermediate diffuser portion, said tapered diffuser portion, said combustion chamber portion, and said tail pipe portion having a common axis with each other; the axis of said valve chamber being so misaligned with respect to said common axis as to render said valve chamber substantially liquid fuel trap-free.

References Cited in the file of this patent

UNITED STATES PATENTS

| | | |
|---|---|---|
| 1,369,672 | Koenig | Feb. 22, 1921 |
| 2,010,020 | Holzwarth | Aug. 6, 1935 |
| 2,612,722 | Tenney | Oct. 7, 1952 |
| 2,701,950 | Huber et al. | Feb. 15, 1955 |
| 2,717,637 | Huber | Sept. 13, 1955 |
| 2,719,580 | Haag et al. | Oct. 4, 1955 |
| 2,748,753 | Sarrazin et al. | June 5, 1956 |
| 2,787,885 | Maynor | Apr. 9, 1957 |

FOREIGN PATENTS

| | | |
|---|---|---|
| 169,483 | Austria | Nov. 26, 1951 |
| 814,347 | France | Mar. 15, 1937 |
| 900,960 | France | Oct. 23, 1944 |

OTHER REFERENCES

Project Squid, Technical Memo. No. Pr. 4, by Guenther Diedrich, Princeton University, June 30, 1948, page 63.